US011236198B2

United States Patent
Honda et al.

(10) Patent No.: US 11,236,198 B2
(45) Date of Patent: *Feb. 1, 2022

(54) MOLDED ARTICLE

(71) Applicant: Mitsubishi Gas Chemical Company, Inc., Chiyoda-ku (JP)

(72) Inventors: Eiichi Honda, Hiratsuka (JP); Yasuaki Yoshimura, Hiratsuka (JP); Keita Noguchi, Niigata (JP); Yuichiro Satake, Hiratsuka (JP)

(73) Assignee: Mitsubishi Gas Chemical Company, Inc., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/964,015

(22) PCT Filed: Jan. 22, 2019

(86) PCT No.: PCT/JP2019/001807
§ 371 (c)(1),
(2) Date: Jul. 22, 2020

(87) PCT Pub. No.: WO2019/146575
PCT Pub. Date: Aug. 1, 2019

(65) Prior Publication Data
US 2020/0347181 A1  Nov. 5, 2020

(30) Foreign Application Priority Data
Jan. 23, 2018 (JP) .............................. JP2018-008902

(51) Int. Cl.
| C08G 63/60 | (2006.01) |
| B29C 45/00 | (2006.01) |
| B29C 45/56 | (2006.01) |
| B29K 67/00 | (2006.01) |
| B29K 105/00 | (2006.01) |

(52) U.S. Cl.
CPC .......... *C08G 63/60* (2013.01); *B29C 45/0001* (2013.01); *B29C 45/561* (2013.01); *B29K 2067/00* (2013.01); *B29K 2105/0085* (2013.01); *B29K 2995/007* (2013.01)

(58) Field of Classification Search
CPC ... B29C 45/00; B29C 45/0001; B29C 45/561; B29K 2067/00; B29K 2105/0085; B29K 2995/007; C08G 63/60; C08L 67/04
See application file for complete search history.

(56) References Cited

U.S. PATENT DOCUMENTS

| 6,048,627 A | 4/2000 | Tsukamoto et al. |
| 10,287,391 B2 * | 5/2019 | Honda ................... C08G 63/06 |
| 10,889,684 B2 * | 1/2021 | Satake ..................... G02B 1/04 |
| 10,894,859 B2 * | 1/2021 | Honda .................. C08G 63/18 |
| 2003/0016334 A1 | 1/2003 | Weber et al. |
| 2005/0001983 A1 | 1/2005 | Weber et al. |
| 2007/0009741 A1 | 1/2007 | Boven et al. |
| 2018/0142059 A1 | 5/2018 | Honda et al. |

FOREIGN PATENT DOCUMENTS

| EP | 3 521 334 A1 | 8/2019 |
| EP | 3 521 867 A1 | 8/2019 |
| EP | 3 521 869 A1 | 8/2019 |
| EP | 3 521 876 A1 | 8/2019 |
| JP | 60-97349 A | 5/1985 |
| JP | 10-3061 47 A | 11/1998 |
| JP | 2004-530165 A | 9/2004 |
| JP | 2007-161917 | * 6/2007 |
| JP | 2007-161917 A | 6/2007 |
| JP | 2009-500195 A | 1/2009 |
| JP | 2010-284943 A | 12/2010 |
| JP | 2012-25790 A | 2/2012 |
| JP | WO/2012/035874 | * 3/2012 |
| WO | WO 2015/118966 A1 | 8/2015 |
| WO | WO 2016/190317 A1 | 12/2016 |
| WO | WO 2018/062325 A1 | 4/2018 |

OTHER PUBLICATIONS

International Search Report dated May 7, 2019 in PCT/JP2019/001807 filed on Jan. 22, 2019, 2 pages.

* cited by examiner

*Primary Examiner* — Ling Siu Choi
*Assistant Examiner* — Gennadiy Mesh
(74) *Attorney, Agent, or Firm* — Oblon, McClelland, Maier & Neustadt, L.L.P.

(57) ABSTRACT

An automobile component including a molded article containing a copolymerized polyester resin synthesized from a hydroxycarboxylic acid monomer, a diol monomer, and a dicarboxylic acid/ester monomer and having a unit (A) of formula (1), a diol unit (B), and a unit (C) derived from a dicarboxylic acid or an ester-forming derivative of the dicarboxylic acid. A content of the unit (A) in the total units of the copolymerized polyester resin is 60 to 90 mol %, The formula (1) is $$\left[ \mathrm{O} \underset{n}{\underbrace{\phantom{XXXX}}} \overset{R_1}{\underset{R_2}{\phantom{X}}} \overset{O}{\underset{\phantom{X}}{\|}} R_3 \right] \quad (1)$$

where $R_1$ is a hydrogen atom, $CH_3$, or $C_2H_5$, $R_2$ and $R_3$ are each independently a hydrogen atom or $CH_3$, and n is 0 or 1.

19 Claims, 3 Drawing Sheets

MOLDED ARTICLE

TECHNICAL FIELD

The present invention relates to a molded article.

BACKGROUND ART

Polycarbonate resin is a thermoplastic resin superior in heat resistance, transparency, mechanical properties, and the like, and has a wide range of applications such as automobile interior panels, headlamp lenses, and housings of mobile phones or personal computers. Since polycarbonate resin is lighter than inorganic glass and superior in productivity, it is also used for automobile window applications. However, a polycarbonate resin using 2,2-bis(4-hydroxyphenyl)propane (hereinafter also referred to as "bisphenol A"), which is widely used at present, has a problem in that its surface hardness represented by pencil hardness is low.

In order to improve the surface hardness of polycarbonate resin, many polycarbonate resins or polycarbonate resin compositions have been proposed. For example, in Patent Literature 1, it is reported that a copolymerized polycarbonate of 1,1-bis(3-methyl-4-hydroxyphenyl)cyclohexane and bisphenol A has a surface hardness as high as 2H in pencil hardness. In Patent Literature 2, it is reported that a composition having a high surface hardness can be obtained while maintaining pencil hardness H and transparency by incorporating a specific (meth)acrylic copolymer, a phosphorus-based stabilizer, and an ester of an aliphatic alcohol and an aliphatic carboxylic acid in specific amounts into an aromatic polycarbonate resin.

CITATION LIST

Patent Literature

Patent Literature 1: National Publication of International Patent Application No. 2009-500195
Patent Literature 2: Japanese Patent Laid-Open No. 2012-025790

SUMMARY OF INVENTION

Technical Problem

According to the technique disclosed in Patent Literatures 1 and 2, although the surface hardness is improved, there is still room for improvement from the viewpoint of weather resistance. That is, a molded article superior in physical property balance of heat resistance, weather resistance, and surface hardness has not yet been obtained.

The present invention has been made in view of the above problems of the prior art, and it is an object of the present invention to provide a molded article superior in physical property balance of heat resistance, weather resistance, and surface hardness.

Solution to Problem

As a result of intensive investigations aimed at solving the above problems, the present inventors have found that a copolymerized polyester resin having a specific alicyclic structure as a constitutional unit can be a solution to the problems, and reached the present invention.

That is, the present invention is as follows.

[1]
A molded article comprising a copolymerized polyester resin comprising a unit (A) represented by the following formula (1), a diol unit (B), and a unit (C) derived from a dicarboxylic acid or an ester-forming derivative of the dicarboxylic acid, wherein
a content of the unit (A) based on total units of the copolymerized polyester resin is 20 to 90 mol %,

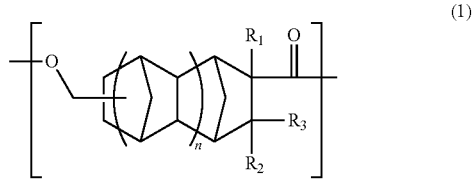

wherein $R_1$ is a hydrogen atom, $CH_3$, or $C_2H_5$, $R_2$ and $R_3$ are each independently a hydrogen atom or $CH_3$, and n is 0 or 1.

[2]
The molded article according to [1], wherein, in the formula (1), $R_1$, $R_2$, and $R_3$ are hydrogen atoms.

[3]
The molded article according to [1] or [2], wherein the unit (B) is a unit derived from an aliphatic diol or a diol having a cardo structure.

[4]
The molded article according to any one of [1] to [3], wherein the unit (C) is a unit derived from an aliphatic dicarboxylic acid or an ester-forming derivative of the aliphatic dicarboxylic acid or a unit derived from a dicarboxylic acid having a cardo structure or an ester-forming derivative of the dicarboxylic acid having the cardo structure.

[5]
The molded article according to any of [1] to [4], wherein the copolymerized polyester resin satisfies the following conditions (1) to (2):
(1) a glass transition temperature of the copolymerized polyester resin is 100° C. or higher; and
(2) a pencil hardness of the molded article is HB or higher.

[6]
A method for producing the molded article according to any one of [1] to [5], comprising:
injection-molding or injection-compression molding the copolymerized polyester resin.

Advantageous Effects of Invention

According to the present invention, it is possible to provide a molded article superior in physical property balance of heat resistance, weather resistance, and surface hardness.

DESCRIPTION OF EMBODIMENTS

Figure 1:
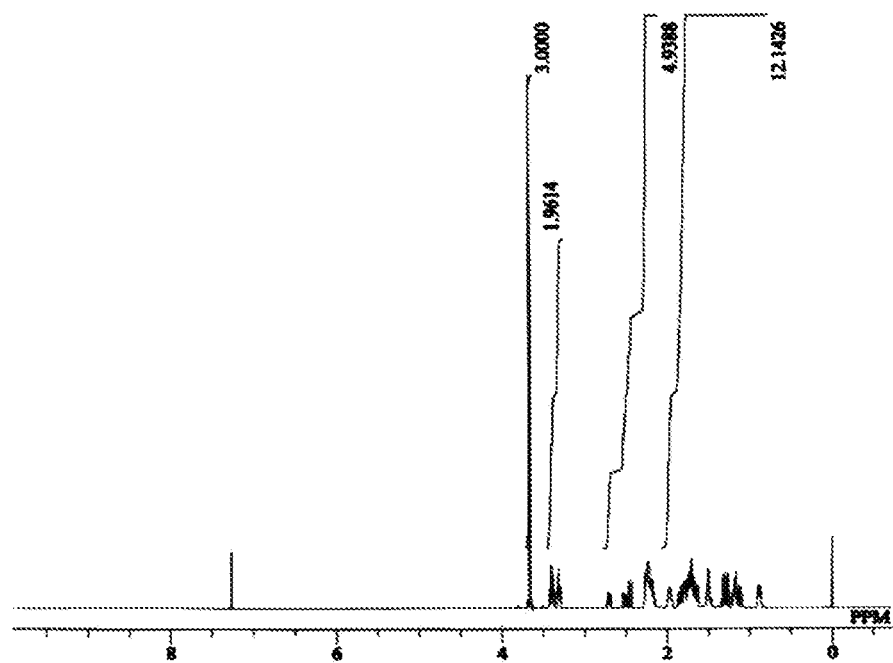
FIG. 1 shows a result of 1H-NMR measurement of a main reaction product obtained in a monomer synthesis example.

An embodiment for carrying out the present invention (which will be simply referred to as "present embodiment" hereinafter) will now be described in detail. The present embodiment described below is only illustrative of the present invention and is not intended to limit the present invention to the contents of the following description. The present invention can be carried out with appropriate modifications falling within the gist of the invention.

A molded article of the present embodiment comprises a copolymerized polyester resin comprising a unit (A) represented by the formula (1), a diol unit (B), and a unit (C) derived from a dicarboxylic acid or an ester-forming derivative of the dicarboxylic acid, wherein a content of the unit (A) based on total units of the copolymerized polyester resin is 20 to 90 mol %.

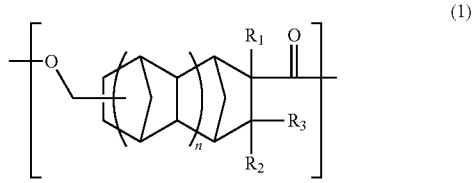

(1)

In the formula (1), $R_1$ is a hydrogen atom, $CH_3$, or $C_2H_5$, $R_2$ and $R_3$ are each independently a hydrogen atom or $CH_3$, and n is 0 or 1.

Being configured as described above, the molded article of the present embodiment is superior in physical property balance of heat resistance, weather resistance, and surface hardness.

(Copolymerized Polyester Resin)

A copolymerized polyester resin in the present embodiment comprises, as constitutional units, a unit (A) represented by the above formula (1) (this unit may be referred to as "unit (A)" hereinafter), a diol unit (B) (this unit may be referred to as "unit (B)" hereinafter), and a unit (C) derived from a dicarboxylic acid or an ester-forming derivative thereof (this unit may be referred to as "unit (C)" hereinafter). In the present embodiment, the content of the unit (A) based on the total units of the copolymerized polyester resin is 20 to 90 mol % from the viewpoint of the balance between heat resistance and formability. If the content is less than 20 mol %, sufficient heat resistance cannot be achieved. When the content is 90 mol % or less, the formability of the resin can be improved while good heat resistance is obtained. From the same viewpoint and further improving the mechanical properties, the content of the unit (A) is preferably 30 to 90 mol %, more preferably 40 to 85 mol %, even more preferably 50 to 85 mol %, and yet even more preferably 60 to 85 mol %.

In the unit (A), $R_1$ in the formula (1) is preferably a hydrogen atom or $CH_3$, and $R_2$ and $R_3$ are preferably hydrogen atoms. In the present embodiment, $R_1$, $R_2$, and $R_3$ in the formula (1) are more preferably hydrogen atoms from the viewpoint of heat resistance.

n in the formula (1) is preferably 1 in order to further improve the heat resistance.

Examples of the constitutional unit (B) is not particularly limited and may be any unit derived from a diol. Specific examples of the constitutional unit (B) include units derived from the following diols: ethylene glycol, trimethylene glycol, 1,4-butanediol, 1,5-pentanediol, 1,6-hexanediol, diethylene glycol, propylene glycol, neopentyl glycol, 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornanedimethanol, tricyclodecanedimethanol, pentacyclopentadecanedimethanol, norbornanediol, cyclohexanediol, 2,2'-bis(4-hydroxycyclohexyl)propane, adamantanediol, 9,9-bis[4-(2-hydroxyethoxy)phenyl]fluorene, 9,9-bis[4-(2-hydroxyethoxy)-3-methylphenyl]fluorene, 9,9-bis[4-(2-hydroxyethoxy)-3-phenylphenyl]fluorene, 9,9-bis(2-hydroxyethyl)fluorene, xylylene glycol, 3,9-bis(1,1-dimethyl-2-hydroxyethyl)-2,4,8,10-tetraoxaspiro[5.5]undecane, 1,4:3,6-dianhydro-D-sorbitol, and 2,2,4,4-tetramethyl-1,3-cyclobutanediol.

The constitutional unit (B) is preferably a unit derived from an aliphatic diol or a diol having a cardo structure in view of obtaining good transparency. Such a unit derived from an aliphatic diol is more preferably a unit derived from 1,4-cyclohexanedimethanol, ethylene glycol, tricyclodecanedimethanol, 3,9-bis(1,1-dimethyl-2-hydroxyethyl)-2,4,8,10-tetraoxaspiro[5.5]undecane, 1,4:3,6-dianhydro-D-sorbitol, or 2,2,4,4-tetramethyl-1,3-cyclobutanediol. The unit derived from a diol having a cardo structure is more preferably a unit derived from 9,9-bis[4-(2-hydroxyethoxy)phenyl]fluorene, 9,9-bis[4-(2-hydroxyethoxy)-3-methylphenyl]fluorene, or 9,9-bis[4-(2-hydroxyethoxy)-3-phenylphenyl]fluorene.

The optical isomerism of these dicarboxylic acids and derivatives thereof is not particularly limited, and they may be a cis isomer, a trans isomer, or a mixture thereof.

One of the above units may be contained alone, or two or more of the above units may be contained in combination.

The content of the unit (B) based on the total units of the copolymerized polyester resin is preferably 5 to 35 mol % and more preferably 6 to 30 mol %.

Examples of the constitutional unit (C) is not particularly limited and may be any unit derived from a dicarboxylic acid or an ester-forming derivative of the dicarboxylic acid. Specific examples of the unit (C) include: constitutional units derived from aromatic dicarboxylic acids such as terephthalic acid, isophthalic acid, phthalic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 2-methylterephthalic acid, biphenyldicarboxylic acid, and tetralindicarboxylic acid and/or derivatives of these aromatic dicarboxylic acids; units derived from aliphatic dicarboxylic acids such as succinic acid, glutaric acid, adipic acid, pimelic acid, suberic acid, azelaic acid, sebacic acid, decanedicarboxylic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane, 5-carboxy-5-ethyl-2-(1,1-dimethyl-2-carboxyethyl)-1,3-dioxane, 1,4:5,8-dimethanodecahydronaphthalenedicarboxylic acid, adamantanedicarboxylic acid, and dimer acids and/or derivatives of these aliphatic dicarboxylic acids; and units derived from dicarboxylic acids having a cardo structure such as 9,9-bis(carboxymethyl)fluorene, 9,9-bis(1-carboxyethyl)fluorene, 9,9-bis(2-carboxyethyl)fluorene, 9,9-bis(1-carboxypropyl)fluorene, 9,9-bis(2-carboxypropyl)fluorene, 9,9-bis(2-carboxy-1-methylethyl)fluorene, 9,9-bis(2-carboxy-1-)methylpropyl)fluorene, 9,9-bis(2-carboxybutyl)fluorene, 9,9-bis(2-carboxy-1-methylbutyl)fluorene, 9,9-bis (5-carboxypentyl)fluorene, and 9,9-bis(4-carboxyphenyl) fluorene and/or derivatives of these dicarboxylic acids having a cardo structure.

The constitutional unit (C) is preferably a unit derived from an aliphatic dicarboxylic acid or an ester-forming derivative thereof or a unit derived from a dicarboxylic acid having a cardo structure or an ester-forming derivative thereof in view of obtaining good transparency. The unit derived from an aliphatic dicarboxylic acid or an ester-forming derivative thereof is more preferably a unit derived from dimethyl 1,4-cyclohexanedicarboxylate from the viewpoint of the physical property balance of transparency and heat resistance. The unit derived from a dicarboxylic acid having a cardo structure or an ester-forming derivative thereof is more preferably a unit derived from 9,9-bis (methoxycarbonylmethyl)fluorene, 9,9-bis(methoxycarbonylethyl)fluorene, or 9,9-bis(methoxycarbonylpropyl)fluorene from the viewpoint of the physical property balance of transparency and heat resistance.

The optical isomerism of these dicarboxylic acids and derivatives thereof is not particularly limited, and they may be a cis isomer, a trans isomer, or a mixture thereof.

One of the above units may be contained alone, or two or more of the above units may be contained in combination.

The content of the unit (C) based on the total units of the copolymerized polyester resin is preferably 5 to 35 mol % and more preferably 6 to 30 mol %.

In the present embodiment, the copolymerized polyester resin may contain a hydroxyl group and a unit other than the units (A) to (C), and the other unit is, for example, a unit (A1) derived from a carboxylic acid or an ester-forming derivative thereof. The unit (A1) is not particularly limited, and examples thereof include units derived from oxyacids such as glycolic acid, lactic acid, hydroxybutyric acid, 2-hydroxyisobutyric acid, hydroxybenzoic acid, 6-hydroxycaproic acid, and 4-hydroxycyclohexanecarboxylic acid and/or derivatives of these oxyacids.

In the present embodiment, although the glass transition temperature (Tg) of the copolymerized polyester resin is not particularly limited as long as the effect of the present embodiment is achieved, the glass transition temperature (Tg) is preferably 100° C. or higher, more preferably 105° C. or higher, even more preferably 110° C. or higher, yet even more preferably 115° C. or higher, still more preferably 120° C. or higher, and yet still more preferably 130° C. or higher from the viewpoint of obtaining sufficient heat resistance. The Tg can be measured by the method described in Examples below. The Tg can be adjusted within the above range, for example, by appropriately adjusting the proportions of starting monomers for the copolymerized polyester resin in copolymerization.

In the present embodiment, the molecular weight of the copolymerized polyester resin can be appropriately set in consideration of desired performance and the handleability and is not particularly limited, and the weight-average molecular weight (Mw) in terms of polystyrene is preferably 5,000 to 200,000 and more preferably 10,000 to 100,000. When the Mw is 5,000 or more, heat resistance tends to be preferably obtained. When the Mw is 200,000 or less, the melt viscosity becomes better, the resin tends to be easily removed after production, and injection-molding tends to be easily performed in a molten state from the viewpoint of fluidity.

Further, when the copolymerized polyester resin in the present embodiment is formed into a molded article, it is suitable to add known additives such as an antioxidant, a release agent, an ultraviolet absorber, a flowability improver, a crystal nucleating agent, a toughener, a dye, an anti-static agent, and an anti-microbial agent. In the present embodiment, the content of the additive that may be contained in the molded article is not particularly limited, and is, for example, preferably 0.0001 to 5% by mass and more preferably 0.0001 to 3% by mass, based on 100% by mass of the molded article. In other words, in the present embodiment, the content of the additive that may be contained in the copolymerized polyester resin contained in the molded article is not particularly limited, and is, for example, preferably 0.0001 to 1% by mass and more preferably 0.0001 to 0.8% by mass, based on 100% by mass of the molded article.

(Method of Producing Copolymerized Polyester Resin)

The copolymerized polyester resin in the present embodiment can be obtained by copolymerization of monomers corresponding to the units (A) to (C). The following will describe a method of producing a monomer corresponding to the unit (A). Such a monomer is represented, for example, by the following formula (2).

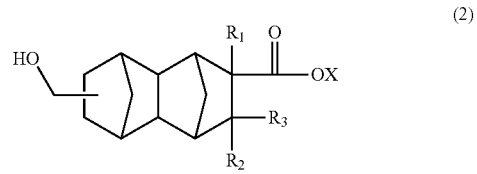

(2)

In the formula (2), $R_1$ is a hydrogen atom, $CH_3$, or $C_2H_5$, $R_2$ and $R_3$ are each independently a hydrogen atom or $CH_3$, X is a hydrogen atom or a hydrocarbon group having four or less carbon atoms and optionally containing a hydroxyl group.

In the formula (2), $R_1$ is preferably a hydrogen atom or $CH_3$. $R_2$ and $R_3$ are preferably hydrogen atoms. Examples of the hydrocarbon group include, but are not limited to, methyl, ethyl, propyl, butyl, vinyl, 2-hydroxyethyl, and 4-hydroxybutyl groups.

The compound represented by the formula (2) in the present embodiment can be synthesized, for example, by a route represented by the following formula (I) using dicyclopentadiene or cyclopentadiene and a functional group-containing olefin as starting materials.

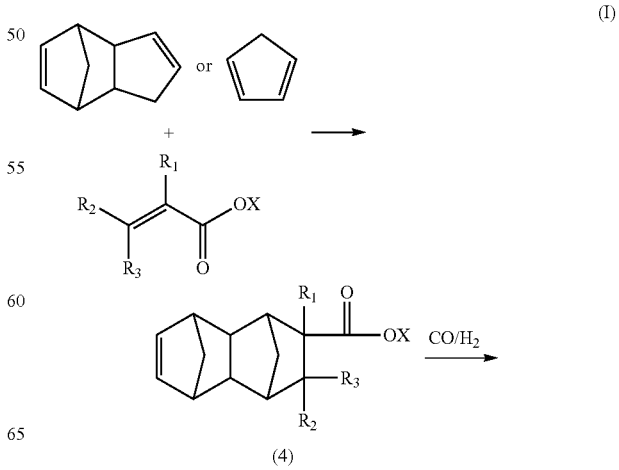

(I)

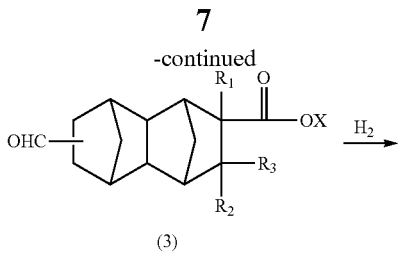

(3)

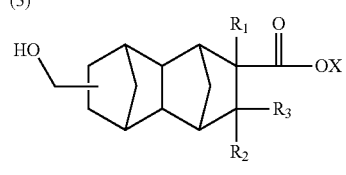

(2)

In the formula (I), $R_1$ is a hydrogen atom, $CH_3$, or $C_2H_5$, $R_2$ and $R_3$ are each independently a hydrogen atom or $CH_3$, X is a hydrogen atom or a hydrocarbon group having four or less carbon atoms and optionally containing a hydroxyl group.

[Production of Monoolefin Having 13 to 21 Carbon Atoms Represented by Formula (4) in Formula (I)]

The monoolefin having 13 to 21 carbon atoms represented by the formula (4) can be produced, for example, by a Diels-Alder reaction between a functional group-containing olefin and dicyclopentadiene.

Specific examples of the functional group-containing olefin used for the Diels-Alder reaction include, but are not limited to, methacrylic acid, methyl methacrylate, ethyl methacrylate, propyl methacrylate, butyl methacrylate, vinyl methacrylate, 2-hydroxyethyl methacrylate, 4-hydroxybutyl methacrylate, acrylic acid, methyl acrylate, ethyl acrylate, propyl acrylate, butyl acrylate, vinyl acrylate, 2-hydroxyethyl acrylate, 4-hydroxybutyl acrylate, crotonic acid, methyl crotonate, ethyl crotonate, 3-methylcrotonic acid, methyl 3-methylcrotonate, and ethyl 3-methylcrotonate. Preferred olefins include methacrylic acid, methyl methacrylate, 2-hydroxyethyl methacrylate, acrylic acid, methyl acrylate, and 2-hydroxyethyl acrylate. More preferred olefins include methyl methacrylate and methyl acrylate.

Examples of the functional group-containing olefin used for the Diels-Alder reaction further include acrylonitrile, methacrylonitrile, acrolein, and methacrolein. With the use of such an olefin as a starting material, for example, a monoolefin represented by formula (4') can be produced by the route represented by the following formula (II) or (III).

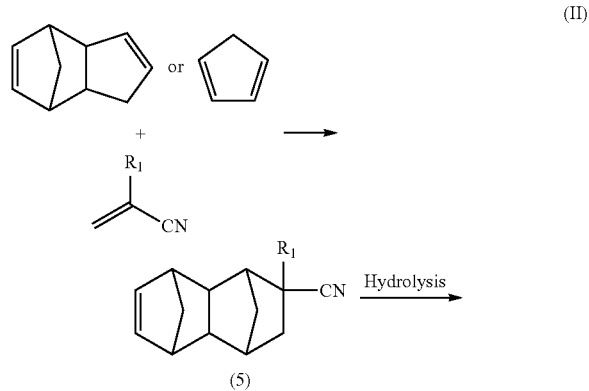

(5)

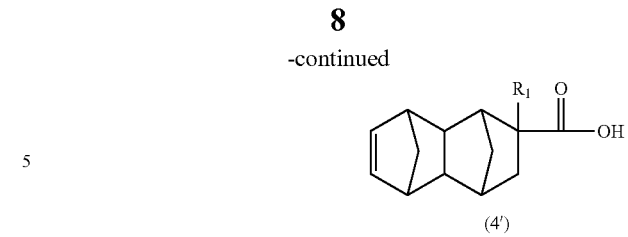

(4')

In the formula (II), $R_1$ is a hydrogen atom or $CH_3$.

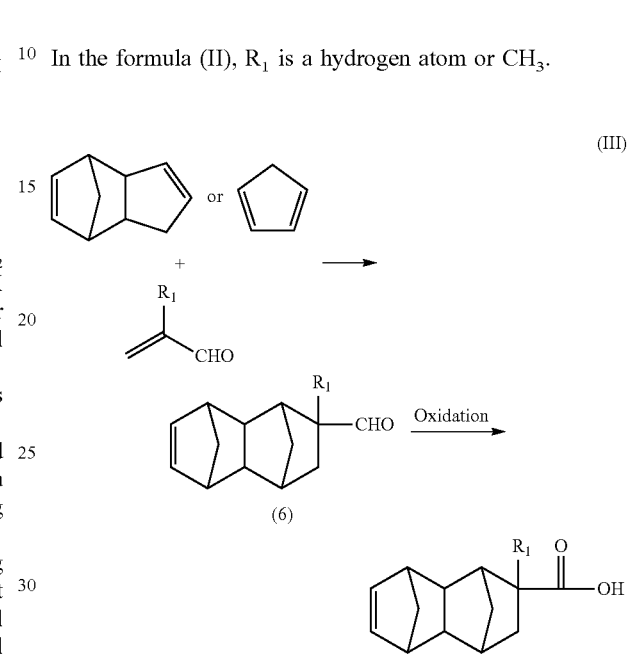

(4')

In the formula (III), $R_1$ is a hydrogen atom or $CH_3$.

The dicyclopentadiene used for the Diels-Alder reaction is preferably highly pure, and the contents of butadiene, isoprene, and other substances are preferably reduced. The purity of the dicyclopentadiene is preferably 90% or more and more preferably 95% or more. Dicyclopentadiene is prone to be depolymerized into cyclopentadiene (so-called monocyclopentadiene) under heating conditions, and it is thus possible to use cyclopentadiene instead of dicyclopentadiene. The monoolefin having 13 to 21 carbon atoms represented by the formula (4) is thought to be produced substantially via a monoolefin having 8 to 16 carbon atoms represented by the following formula (7) (product of first Diels-Alder reaction), and the produced monoolefin represented by the formula (7) is thought to act as a new diene-reactive compound (dienophile) which is involved in a Diels-Alder reaction (second Diels-Alder reaction) with cyclopentadiene (diene) present in the reaction system to produce the monoolefin having 13 to 21 carbon atoms represented by the formula (4).

In view of these points, for example, the monoolefin having 13 to 21 carbon atoms represented by the formula (4) or the monoolefin having 8 to 16 carbon atoms represented by the formula (7) can be selectively obtained by appropriately controlling the reaction conditions of the first Diels-Alder reaction in the reaction route represented by the formula (I).

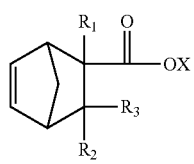

(7)

In the formula (7), R₁ is a hydrogen atom, CH₃, or C₂H₅, R₂ and R₃ are each independently a hydrogen atom or CH₃, X is a hydrogen atom or a hydrocarbon group having four or less carbon atoms and optionally containing a hydroxyl group.

In order to allow the two-step Diels-Alder reaction to proceed efficiently, i.e., in order to selectively obtain the monoolefin having 13 to 21 carbon atoms represented by the formula (4), the presence of cyclopentadiene in the reaction system is important. Therefore, the reaction temperature is preferably 100° C. or higher, more preferably 120° C. or higher, and even more preferably 130° C. or higher. In order to selectively obtain the monoolefin having 8 to 16 carbon atoms represented by the formula (7), the reaction temperature is preferably lower than 180° C. In either case, the reaction is preferably carried out at a temperature of 250° C. or lower in order to inhibit formation of a high-boiling substance as a by-product.

The monoolefin having 13 to 21 carbon atoms represented by the formula (4) obtained as described above can be subjected to a hydroformylation reaction and reduction reaction as described below to obtain a monomer corresponding to the unit of the formula (1) wherein n=(i.e., a compound represented by the formula (2)). The monoolefin having 8 to 16 carbon atoms represented by the formula (7) obtained as described above can be subjected to a similar hydroformylation reaction and reduction reaction to obtain a monomer corresponding to the unit of the formula (1) wherein n=0 (i.e., a compound represented by the formula (8)).

A hydrocarbon, an alcohol, or an ester can also be used as the reaction solvent and, for example, aliphatic hydrocarbons having 6 or more carbon atoms, cyclohexane, toluene, xylene, ethylbenzene, mesitylene, propanol, and butanol are preferred. A known catalyst such as AlCl₃ may be added if necessary.

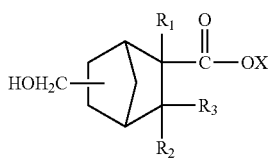

(8)

In the formula (8), R₁ is a hydrogen atom, CH₃, or C₂H₅, R₂ and R₃ are each independently a hydrogen atom or CH₃, and X is a hydrogen atom or a hydrocarbon group having four or less carbon atoms and optionally containing a hydroxyl group.

The Diels-Alder reaction can be conducted in various reaction modes such as a batch mode using a tank reactor or like means, a semibatch mode in which a substrate or substrate solution is supplied to a tank reactor under predetermined reaction conditions, and a continuous flow mode in which a substrate is made to flow in a tubular reactor under predetermined reaction conditions.

The reaction product as obtained by the Diels-Alder reaction may directly be used as a starting material for the hydroformylation reaction or may be purified by a technique such as distillation, extraction, or crystallization prior to being subjected to the subsequent step.

[Production of Difunctional Compound Having 14 to 22 Carbon Atoms Represented by (3) in Formula (I)]

The difunctional compound having 14 to 22 carbon atoms represented by the formula (3) in the formula (I) can be produced, for example, by subjecting the monoolefin having 13 to 21 carbon atoms represented by the formula (4), carbon monoxide gas, and hydrogen gas to a hydroformylation reaction in the presence of a rhodium compound and an organophosphorus compound.

The rhodium compound used in the hydroformylation reaction may be any compound which forms a complex with an organophosphorus compound and which exhibits hydroformylation activity in the presence of carbon monoxide and hydrogen, and the form of the precursor of the rhodium compound is not particularly limited. For example, a catalyst precursor such as dicarbonylacetylacetonato rhodium (hereinafter referred to as "Rh(acac) (CO)₂"), Rh₂O₃, Rh₄(CO)₁₂, Rh₆ (CO)₁₆, or Rh(NO₃)₃ may be introduced, together with an organophosphorus compound, into a reaction mixture, and thus a rhodium carbonyl hydride-phosphorus complex having catalytic activity may be formed in a reaction vessel. Alternatively, a rhodium carbonyl hydride-phosphorus complex may be prepared beforehand, and the prepared complex may be introduced into a reactor. A specific example of preferred methods is a method in which Rh(acac) (CO)₂ is reacted with an organophosphorus compound in the presence of a solvent and then the reaction product is introduced together with excess of the organophosphorus compound into a reactor so as to give a rhodium-organophosphorus complex having catalytic activity.

Investigations by the present inventors have revealed that a two-step Diels-Alder reaction product represented by the formula (4) which has an internal olefin with a relatively high molecular weight can be hydroformylated with an extremely small amount of rhodium catalyst. The amount of the rhodium compound used in the hydroformylation reaction is preferably 0.1 to 60 micromoles, more preferably 0.1 to 30 micromoles, even more preferably 0.2 to 20 micromoles, and particularly preferably 0.5 to 10 micromoles, based on 1 mole of the monoolefin having 13 to 21 carbon atoms represented by the formula (4) which is a substrate in the hydroformylation reaction. When the amount of the rhodium compound used is less than 60 micromoles based on 1 mole of the monoolefin having 13 to 21 carbon atoms, it can be considered that there is no practical need for any installation for collecting and recycling the rhodium complex. Thus, the present embodiment enables reduction in economic burden associated with collecting/recycling installations, thereby allowing reduction in cost associated with rhodium catalysts.

The organophosphorus compound which forms the hydroformylation reaction catalyst for the hydroformylation reaction in the present embodiment together with the rhodium compound is not particularly limited, and examples of the organophosphorus compound include a phosphine represented by the formula P (—R$_a$)(—R$_b$)(—R$_c$) and a phosphite represented by the formula P (—OR$_a$)(—OR$_b$)(—OR$_c$). Specific examples of R$_a$, R$_b$, and R$_c$ include, but are not limited to, an aryl group which may be substituted with an alkyl or alkoxy group having 1 to 4 carbon atoms, and an alicyclic alkyl group which may be substituted with an alkyl or alkoxy group having 1 to 4 carbon atoms; and triphenylphosphine and triphenyl phosphite are suitably used. The amount of the organophosphorus compound used is preferably 300 to 10000 times, more preferably 500 to 10000 times, even more preferably 700 to 5000 times, particularly preferably 900 to 2000 times, the amount of rhodium atoms in the rhodium compound on a molar basis. When the amount of the organophosphorus compound used is 300 or more times the amount of rhodium atoms on a molar basis, sufficient stability of the rhodium carbonyl hydride-phosphorus complex serving as a catalytically active material tends to be obtained, with the result that good reactivity tends to be obtained. The amount of the organophosphorus compound used is preferably 10000 or less times the amount of rhodium atoms on a molar basis, in view of sufficiently reducing the cost spent on the organophosphorus compound.

The hydroformylation reaction can be carried out without the use of any solvent. However, with the use of a solvent inert in the reaction, the reaction can be accomplished in a more preferred manner. The solvent used in the hydroformylation reaction is not particularly limited and can be any solvent capable of dissolving the monoolefin having 13 to 21 carbon atoms represented by the formula (4), dicyclopentadiene or cyclopentadiene, the rhodium compound, and the organophosphorus compound. Specific examples of the solvent include, but are not limited to: hydrocarbons such as aliphatic hydrocarbons, alicyclic hydrocarbons, and aromatic hydrocarbons; esters such as aliphatic esters, alicyclic esters, and aromatic esters; alcohols such as aliphatic alcohols and alicyclic alcohols; and solvents such as aromatic halides. Among these, hydrocarbons are suitably used and, in particular, alicyclic hydrocarbons and aromatic hydrocarbons are more suitably used.

The temperature during the hydroformylation reaction is preferably 40° C. to 160° C. and more preferably 80° C. to 140° C. When the reaction temperature is 40° C. or higher, a sufficient reaction rate tends to be achieved, and the monoolefin as a starting material tends to be prevented from remaining unreacted. Setting the reaction temperature to 160° C. or lower tends to reduce formation of by-products derived from the starting monoolefin or the reaction product and effectively prevent decrease in reaction performance.

The hydroformylation reaction in the present embodiment is preferably carried out under pressurization with carbon monoxide (occasionally referred to as "CO" hereinafter) gas and hydrogen (occasionally referred to as "$H_2$" hereinafter) gas. In this case, the CO and $H_2$ gases can be each independently introduced into the reaction system or can be introduced into the reaction system together in the form of a mixed gas prepared beforehand. The molar ratio between the CO and $H_2$ gases (=CO/$H_2$) introduced into the reaction system is preferably 0.2 to 5, more preferably 0.5 to 2, and even more preferably 0.8 to 1.2. When the molar ratio between the CO and $H_2$ gasses is adjusted within the above range, the activity of the hydroformylation reaction or the selectivity to the intended aldehyde tends to be increased. The amount of the CO and $H_2$ gases introduced into the reaction system decreases as the reaction proceeds, and thus the use of a CO/$H_2$ mixed gas prepared beforehand may facilitate the reaction control.

The reaction pressure in the hydroformylation reaction is preferably 1 to 12 MPa, more preferably 1.2 to 9 MPa, and even more preferably 1.5 to 5 MPa. Setting the reaction pressure to 1 MPa or more tends to provide a sufficient reaction rate, and tends to sufficiently prevent the monoolefin as a starting material from remaining unreacted. Setting the reaction pressure to 12 MPa or less eliminates the need for any expensive installation having high pressure resistance and is therefore economically advantageous. In particular, when the reaction is carried out in a batch mode or semibatch mode which involves depressurization by discharge of the CO and $H_2$ gases after completion of the reaction, a lower reaction pressure causes a smaller loss of the CO and $H_2$ gases and is therefore more economically advantageous.

The suitable reaction mode of the hydroformylation reaction is a batch reaction or semibatch reaction. The semibatch reaction can be carried out by placing the rhodium compound, the organophosphorus compound, and the solvent in a reactor, creating the previously described reaction conditions through pressurization with a CO/$H_2$ gas and/or heating, and then supplying the monoolefin as a starting material or a solution of the monoolefin to the reactor.

The reaction product as obtained by the hydroformylation reaction may directly be used as a starting material for the subsequent reduction reaction or may be purified by distillation, extraction, or crystallization prior to being subjected to the subsequent step.

[Production of Compound Having 14 to 22 Carbon Atoms Represented by Formula (2)]

The compound having 14 to 22 carbon atoms represented by the formula (2) in the formula (I) can be produced by a reduction reaction of the compound having 14 to 22 carbon atoms represented by the formula (3) in the presence of a catalyst having hydrogenation activity and hydrogen.

In the reduction reaction, a catalyst containing at least one element selected from the group consisting of copper, chromium, iron, zinc, aluminum, nickel, cobalt, and palladium is preferably used as the catalyst having hydrogenation activity. Examples of more preferred catalysts include a Cu—Cr catalyst, a Cu—Zn catalyst, and a Cu—Zn—Al catalyst and further include a Raney-Ni catalyst and a Raney-Co catalyst. A Cu—Cr catalyst and a Raney-Co catalyst are even more preferred.

The amount of the hydrogenation catalyst used is 1 to 100% by mass, preferably 2 to 50% by mass, and more preferably 5 to 30% by mass, based on the compound having 14 to 22 carbon atoms represented by the formula (3) which is a substrate. Setting the amount of the catalyst used within these ranges enables the hydrogenation reaction to take place in a suitable manner. When the amount of the catalyst used is 1% by mass or more, the reaction tends to be achieved sufficiently to obtain a sufficient yield of the intended product. When the amount of the catalyst used is 100% by mass or less, a good balance tends to be established between the amount of the catalyst used for the reaction and the increasing effect on the reaction rate.

The reaction temperature in the reduction reaction is preferably 60 to 200° C. and more preferably 80° C. to 150° C. Setting the reaction temperature to 200° C. or lower tends to prevent the occurrence of side reaction or decomposition reaction and give the intended product in a high yield. Setting the reaction temperature to 60° C. or higher tends to allow completion of the reaction in a moderate period of time and enable avoidance of decrease in productivity or decrease in yield of the intended product.

The reaction pressure in the reduction reaction, as expressed by a hydrogen partial pressure, is preferably 0.5 to 10 MPa and more preferably 1 to 5 MPa. Setting the hydrogen partial pressure to 10 MPa or less tends to prevent the occurrence of side reaction or decomposition reaction and give the intended product in a high yield. Setting the hydrogen partial pressure to 0.5 MPa or more tends to allow completion of the reaction in a moderate period of time and enable avoidance of decrease in productivity or decrease in yield of the intended product. In the reduction reaction, an inert gas (such as nitrogen or argon) may be additionally present.

In the reduction reaction, a solvent can be used. Examples of the solvent used in the reduction reaction include aliphatic hydrocarbons, alicyclic hydrocarbons, aromatic hydrocarbons, and alcohols, among which alicyclic hydrocarbons, aromatic hydrocarbons, and alcohols are preferred. Specific examples of the solvent include cyclohexane, toluene, xylene, methanol, ethanol, and 1-propanol.

The reduction reaction can be conducted in various reaction modes such as a batch mode using a tank reactor or like means, a semibatch mode in which a substrate or substrate solution is supplied to a tank reactor under predetermined reaction conditions, and a continuous flow mode in which a substrate or substrate solution is made to flow in a tubular reactor filled with a forming catalyst under predetermined reaction conditions.

The reaction product obtained by the reduction reaction can be purified, for example, by distillation, extraction, or crystallization.

The method used in the present embodiment to copolymerize the compound represented by the formula (2) or the compound represented by the formula (8) as a monomer corresponding to the unit (A) with other monomers corresponding to the units (B) and (C) is not particularly limited, and a conventionally known method for producing polyester can be employed. Examples of the method include: melt polymerization methods such as transesterification and direct esterification; and solution polymerization methods.

For production of the copolymerized polyester resin of the present embodiment, a catalyst used for production of common polyester resins, such as a transesterification catalyst, an esterification catalyst, or a polycondensation catalyst, may be used. The catalyst is not particularly limited, and examples thereof include: compounds (e.g., fatty acid salts, carbonic acid salts, phosphoric acid salts, hydroxides, chlorides, oxides, and alkoxides) of metals such as zinc, lead, cerium, cadmium, manganese, cobalt, lithium, sodium, potassium, calcium, nickel, magnesium, vanadium, aluminum, titanium, antimony, germanium, and tin; and metallic magnesium. These may be used alone, or two or more thereof may be used in combination. Among the above examples, preferred catalysts are compounds of manganese, cobalt, zinc, titanium, calcium, antimony, germanium, and tin. Compounds of manganese, titanium, antimony, germanium, and tin are more preferred. The amount of such a catalyst used is not particularly limited. The catalyst amount on a meatal component basis is preferably 1 to 1000 ppm, more preferably 3 to 750 ppm, and even more preferably 5 to 500 ppm, based on the starting materials for the polyester resin.

The reaction temperature in the polymerization reaction depends on the type and amount of the catalyst used and is typically selected in the range of 150° C. to 300° C. From the viewpoint of the reaction rate and coloring of the resulting resin, the reaction temperature is preferably 180° C. to 280° C. It is preferable that the pressure inside the reaction tank be initially atmospheric pressure and finally controlled to 1 kPa or less, more preferably to 0.5 kPa or less.

For the polymerization reaction, a phosphorus compound may be added if desired. Examples of the phosphorus compound include, but are not limited to, phosphoric acid, phosphorous acid, phosphoric acid esters, and phosphorous acid esters. Examples of the phosphoric acid esters include, but are not limited to, methyl phosphate, ethyl phosphate, butyl phosphate, phenyl phosphate, dimethyl phosphate, diethyl phosphate, dibutyl phosphate, diphenyl phosphate, trimethyl phosphate, triethyl phosphate, tributyl phosphate, and triphenyl phosphate. Examples of the phosphorous acid esters include, but are not limited to, methyl phosphite, ethyl phosphite, butyl phosphite, phenyl phosphite, dimethyl phosphite, diethyl phosphite, dibutyl phosphite, diphenyl phosphite, trimethyl phosphite, triethyl phosphite, tributyl phosphite, and triphenyl phosphite. These may be used alone, or two or more thereof may be used in combination. The concentration of phosphorus atoms in the copolymerized polyester resin of the present embodiment is preferably 1 to 500 ppm, more preferably 5 to 400 ppm, and even more preferably 10 to 200 ppm.

For production of the copolymerized polyester resin in the present embodiment, an etherification inhibitor, a stabilizer such as a thermal stabilizer or light stabilizer, and a polymerization modifier can be used.

<Automobile Component>

As one aspect of the molded article of the present embodiment, the molded article may be used as an automobile component. That is, the automobile component of the present embodiment contains the copolymerized polyester resin of the present embodiment, which can be applied to various automobile parts, and the specific application thereof is not particularly limited. The automobile components of the present embodiment can typically be used as automotive interior and exterior components, and can be applied to, but not limited to, for example, automotive exterior components such as fenders, bumpers, fascias, door panels, side garnishes, pillars, radiator grilles, side protectors, side moldings, rear protectors, rear moldings, various spoilers, bonnets, roof panels, trunk lids, detachable tops, window reflectors, mirror housings, and outer door handles, instrument panels, center console panels, meter components, various switches, car navigation components, car audiovisual components, mobile computer components, and head-up display components. Examples thereof further include lamp lenses (headlight lamp lens, rear lamp lens, direction indicating lamp lens, room lamp lens, etc.) for automobiles (including two-wheeled automobiles), windows, housings, and specially shaped components.

In the present embodiment, various known additives can be added in addition to the copolymerized polyester resin in the present embodiment to form various molded articles such as automobile components without departing from the spirit of the present embodiment. Examples of the additives include, but not limited to, other resins, colorants, light stabilizers, antioxidants, neutralizing agents, ultraviolet absorbers, release agents, antistatic agents, lubricants, lubricating agents, plasticizers, compatibilizers, flame retardants, fillers, dyes and pigments, anti-fogging agents, anti-blocking agents, flow improvers, dispersants, and anti-microbial agents.

Typical examples of the application of the lamp lenses for automobiles include, but are not limited to, impact resistance improvers, flame retardants, flame retardant aids, hydrolysis inhibitors, antistatic agents, foaming agents, and dyes and pigments. The copolymerized polyester resin may also be applied to automobile components as a polymer alloy obtained by kneading with a synthetic resin such as aromatic polycarbonate, aliphatic polycarbonate, aromatic polyester, polyamide, polystyrene, polyolefin, acrylate, and amorphous polyolefin, or a biodegradable resin such as polylactic acid and polybutylene succinate.

As described above, the resin composition containing the copolymerized polyester resin of the present embodiment and other resins can be formed into the molded article of the present embodiment. Examples of other resins preferably used in the present embodiment include, but are not limited to, polycarbonate resin. The polycarbonate resin is not particularly limited, and various known polycarbonate resins may be used, and one of the polycarbonate resins may be used alone or two or more of polycarbonate resin may be used in combination in an arbitrary ratio.

In the resin composition of the present embodiment, the mass ratio of the polycarbonate resin based on the total mass of the copolymerized polyester resin and the polycarbonate resin is not particularly limited, but is preferably 2 to 99.5% by mass, more preferably 10 to 98% by mass, even more preferably 30 to 95% by mass, and yet even more preferably 50 to 90% by mass. When the mass ratio is 2 to 99.5% by mass, the molded article tends to be superior in transparency, heat resistance, surface hardness, chemical resistance, mechanical strength, and forming processability. In the present embodiment, it is particularly preferable that the content of the copolymerized polyester resin and the content of the polycarbonate resin be approximately equal to each other, or the content of the polycarbonate resin be relatively large.

The resin composition of the present embodiment can exhibit various characteristics depending on the blending ratio of the copolymerized polyester resin and the polycarbonate resin. That is, when the proportion of the polycarbonate resin is increased in the above-described mass ratio range, heat resistance and mechanical strength tend to be particularly excellent, and when the proportion of the copolymerized polyester resin is increased, surface hardness, chemical resistance, and forming processability tend to be particularly excellent.

The polycarbonate resin in the present embodiment is not particularly limited, but is preferably a polycarbonate polymer or copolymer that may have a branched structure obtainable by reacting an aromatic dihydroxy compound and optionally a small amount of a polyhydroxy compound and the like with phosgene or a carbonic diester. For the production of the polycarbonate resin, a terminating agent may also be incorporated.

Examples of the polycarbonate resin include polycarbonate resins containing a repeating unit of the formula (9) and/or (10), or a polycarbonate resin consisting of a repeating unit of the formula (9) and/or (10). Further, the repeating unit of the formula (9) and/or (10) include those branched by side reactions.

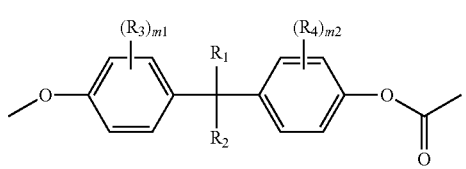

(9)

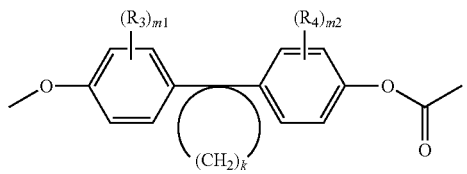

(10)

In the formulas (9) and (10), $R_1$ and $R_2$ are each independently selected from a hydrogen atom, an acyclic hydrocarbon group having 1 to 10 carbon atoms, an aryl group having 6 to 18 carbon atoms, and an alicyclic hydrocarbon group having 5 to 10 carbon atoms; $R_3$ and $R_4$ are each independently selected from a halogen atom, an aliphatic hydrocarbon group having 1 to 10 carbon atoms, an aryl group having 6 to 18 carbon atoms, an oxyalkyl group having 1 to 10 carbon atoms, and an oxyaryl group having 6 to 18 carbon atoms; m1 and m2 are each independently 0 to 4; and k is 4 or 5.

In the formulas (9) and (10), $R_1$ and $R_2$ are preferably selected from a hydrogen atom, an acyclic hydrocarbon group having 1 to 4 carbon atoms, and an aryl group having 6 to 8 carbon atoms; $R_3$ and $R_4$ are preferably selected from a halogen atom, an acyclic hydrocarbon group having 1 to 4 carbon atoms, and an aryl group having 6 to 8 carbon atoms; m1 and m2 are preferably 0 to 2; and k is 4 or 5.

Aromatic hydroxy compounds that may be used as starting materials for the polycarbonate resin in the present embodiment are not particularly limited, and examples of the aromatic hydroxy compounds include: bis(hydroxyaryl)alkanes such as 2,2-bis(4-hydroxyphenyl)propane (otherwise known as bisphenol A), 2,2-bis(3,5-dibromo-4-hydroxyphenyl)propane (otherwise known as tetrabromobisphenol A), bis(4-hydroxyphenyl) methane, 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-tert-butyl-4 hydroxyphenyl)propane, 2,2-bis(3-bromo-4-hydroxyphenyl)propane, and 2,2-bis(3,5-dichloro-4-hydroxyphenyl)propane; bis(hydroxyaryl)cycloalkanes such as 1,1-bis(4-hydroxyphenyl)cyclopentane, 1,1-bis(4-hydroxyphenyl)cyclohexane (bisphenol Z), 1,1-bis(3,5-dibromo-4-hydroxyphenyl)cyclohexane, and 1,1-bis(3,5-dichloro-4-hydroxyphenyl)cyclohexane; bis(hydroxyaryl)arylalkanes such as 1,1-bis(4-hydroxyphenyl)-1-phenylethane and 1,1-bis(4-hydroxyphenyl)diphenylmethane; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; and hydroquinone, resorcinol, and 4,4'-dihydroxydiphenyl. Among these, bisphenol A, tetrabromobisphenol A, and bisphenol Z are more preferred, and bisphenol A is particularly preferred from the viewpoint of heat resistance, mechanical performance, economical efficiency and the like of the molded article. That is, the polycarbonate resin is particularly preferably a polycarbonate ester of bisphenol A.

In addition to the above, the polycarbonate resin is also preferably a polycarbonate resin (A) containing a structural unit of the following formula (11).

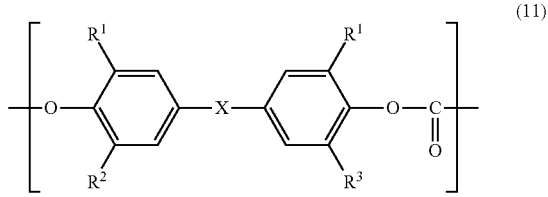

(11)

In the formula (11), $R^1$ represents a methyl group, $R^2$ and $R^3$ are each independently represent a hydrogen atom or a methyl group, and X represents an alkylene group or an alkylidene group.

In the formula (11), $R^1$ is a methyl group, $R^2$ and $R^3$ are each independently a hydrogen atom or a methyl group, and $R^2$ and $R^3$ are particularly preferably a hydrogen atom.

X is an alkylene group or an alkylidene group, and the alkylene group is preferably an alkylene group having 1 to 6 carbon atoms, and may be linear or branched. Examples thereof include methylene, 1,2-ethylene, 1,3-propylene, 1,4-butylene and 1,6-hexylene.

The alkylidene group is preferably an alkylidene group having 2 to 10 carbon atoms, and examples thereof include ethylidene, 2,2-propylidene, 2,2-butylidene, and 3,3-hexylidene.

X is preferably an alkylidene group, particularly preferably a 2,2-propylidene group (i.e., isopropylidene group).

Preferred specific examples of the polycarbonate resin (A) include polycarbonate resins A) to B) described below.

A) a polycarbonate resin having a 2,2-bis(3-methyl-4-hydroxyphenyl)propane structural unit, that is, a polycarbonate resin having a structural unit in which $R^1$ is a methyl group, $R^2$ and $R^3$ are hydrogen atoms, and X is an isopropylidene group.

B) a polycarbonate resin having a 2,2-bis(3,5-dimethyl-4-hydroxyphenyl)propane structural unit, that is, a polycarbonate resin having a structural unit in which $R^1$ is a methyl group, $R^2$ and $R^3$ are methyl groups, and X is an isopropylidene group.

Among them, the polycarbonate resin (A) is particularly preferable.

These polycarbonate resins can be produced by using 2,2-bis(3-methyl-4-hydroxyphenyl)propane and 2,2-bis(3,5-dimethyl-4-hydroxyphenyl) propane as dihydroxy compounds.

The polycarbonate resin (A) may have a carbonate structural unit other than the structural unit of the formula (11), and may have, for example, a structural unit of the following formula (12) or a structural unit derived from another dihydroxy compound as described later. In this case, the copolymerization amount of the structural unit other than the structural unit of the formula (11) is typically 60 mol % or less, preferably 50 mol % or less, more preferably 40 mol % or less, and even more preferably 30 mol % or less.

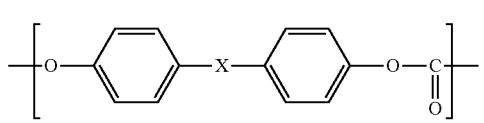

(12)

In the formula (12), X has the same meaning as X in the formula (11).

A preferred specific example of the polycarbonate structural unit of the formula (12) is 2,2-bis(4-hydroxyphenyl)propane, i.e., a carbonate structural unit derived from bisphenol A represented by the structural unit of the following chemical formula (13).

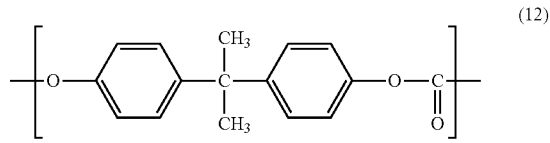

(12)

Examples of other dihydroxy compounds include the following aromatic dihydroxy compounds.

Included are: bis(4-hydroxyphenyl)methane, 2,2-bis(4-hydroxyphenyl)butane, 2,2-bis(4-hydroxyphenyl) pentane, 2,2-bis(4-hydroxyphenyl)-4-methylpentane, 1,1-bis(4-hydroxyphenyl)decane, 1,1-bis(4-hydroxyphenyl)cyclohexane, 1,1-bis(4-hydroxyphenyl)-1-phenylethane, bis(4-hydroxyphenyl)phenylmethane, 1,1-bis(4-hydroxyphenyl) cyclopentane, 1,1-bis(4-hydroxyphenyl)cyclooctane, 9,9-bis(4-hydroxyphenyl)fluorene, 4,4'-dihydroxybenzophenone, and 4,4'-dihydroxyphenyl ether.

The polycarbonate resin (A) preferably has a viscosity-average molecular weight (Mv) of 16,000 to 28,000. When the viscosity-average molecular weight is in this range, it is easy to obtain a molded article having good formability, high mechanical strength and good scratch resistance, when the viscosity-average molecular weight is less than 16,000, it is easy to remarkably reduce the surface impact resistance, and when the viscosity-average molecular weight is more than 28,000, it is easy to increase the melt viscosity, thereby making injection-molding difficult. The lower limit of the molecular weight of the polycarbonate resin (A) is more preferably 17,000, even more preferably 18,000, and particularly preferably 20,000, and the upper limit thereof is more preferably 27,000.

Here, when the polycarbonate resin is mixed and used, the viscosity-average molecular weight (Mv) of the polycarbonate resin (A) refers to the viscosity-average molecular weight (Mv) of the mixture of the polycarbonate resin, and this does not excludes mixtures in which the individual polycarbonate resins constituting the mixture have a viscosity-average molecular weight outside the above range of the viscosity-average molecular weight (Mv).

In the present specification, the viscosity-average molecular weight (Mv) of the polycarbonate resin means a value calculated from Schnell's viscosity formula: $\eta=1.23\times 10^{-4}M^{0.83}$ by using dichloromethane as a solvent and a Ubbelohde viscometer to determine the intrinsic viscosity ($\eta$) (unit dl/g) at a temperature of 20° C.

[Method for Producing Resin Composition]

The method for producing the resin composition is not particularly limited, and various known production methods can be widely adopted, including a method in which the polycarbonate resin (A), the copolymerized polyester resin in the present embodiment, and other components to be blended as necessary are preliminarily mixed using various mixers such as a tumbling mixer and Henschel mixer, and then melt-kneaded using a mixer such as a Banbury mixer, a roller, a Brabender mixer, a single-screw kneading extruder, a twin-screw kneading extruder, and a kneader.

The melt-kneading temperature is not particularly limited, but is typically in the range of 240 to 320° C.

In the present embodiment, although the pencil hardness of the molded article is not limited as long as the effect of the present embodiment is achieved, the pencil hardness is preferably HB or higher, and more preferably F or higher from the viewpoint of obtaining sufficient surface hardness. The pencil hardness can be measured by the method described in Examples below. The pencil hardness can be adjusted within the above range, for example, by appropriately adjusting the proportions of starting monomers for the copolymerized polyester resin in copolymerization.

<Method for Producing Molded Article>

In the present embodiment, the method for producing the molded article according to the present embodiment is not particularly limited as long as the molded article according to the present embodiment is produced using the copolymerized polyester resin of the present embodiment.

For example, pellets obtained by pelletizing the above copolymerized polyester resin may be formed by various forming methods to form a molded article. Further, it is also possible to directly form a resin melt-kneaded by an extruder without passing through the pellets to form a molded article.

The shape of the molded article is not particularly limited, and can be appropriately selected according to the use and purpose of the molded article, and examples thereof include those having a tabular shape, a plate shape, a rod shape, a sheet shape, a film shape, a cylindrical shape, an annular shape, a circular shape, an elliptical shape, a polygonal shape, a profile shape, a hollow shape, a frame shape, a box shape, and a panel shape. Specific examples of the molded article include, in the case of an automobile component, molded articles having various shapes such as interior panels for automobiles, headlamp lenses for automobiles (including two-wheeled automobiles), windows, housings, and specially shaped components. Further, for example, the molded article may have an irregular surface, or may have a three-dimensional shape with a three-dimensional curved surface. When the molded article is used as a sheet, film, or in tabular shape, or the like, the molded article may be a laminate having a multilayer structure laminated with another resin sheet.

The method for forming the molded article is not particularly limited, and a conventionally known forming method can be adopted, and examples thereof include injection-molding methods, injection-compression molding methods, extrusion methods, profile extrusion methods, transfer molding methods, hollow molding methods, gas assisted hollow molding methods, blow molding methods, extrusion blow molding methods, IMC (in-mold coating) molding methods, rotational molding methods, multilayer molding methods, two-color molding methods, insert molding methods, sandwich molding methods, foaming molding methods, and pressure molding methods.

As the forming method in the present embodiment, injection-molding or injection-compression molding is preferably used, although it depends on the shape and dimensions of the desired molded article. In addition to the conventional cold runner system, a hot runner system may also be used. In addition, insert molding, in-mold coating molding, two-color molding, sandwich molding or the like can be also performed. Furthermore, in order to obtain a deep and clear jet blackness in the case of automobile component, heat insulating mold-using molding and rapid heating and cooling mold-using molding may also be used.

As described above, the method for producing a molded article according to the present embodiment preferably includes injection-molding or injection-compression molding of the copolymerized polyester resin of the present embodiment.

EXAMPLES

Hereinafter, the present invention will be described in more detail with examples. The scope of the present invention is not limited by the examples. The methods employed for evaluation of copolymerized polyester resins are as described below.

(1) Composition of Resin

The proportions of the diol constitutional unit and dicarboxylic acid constitutional unit in the copolymerized polyester resin were calculated by $^1$H-NMR measurement. The measurement apparatus used was a nuclear magnetic resonance apparatus (available from JEOL Ltd., product name: JNM-AL400), and the measurement was conducted at 400 MHz. The solvent used was deuterated chloroform.

(2) Weight-Average Molecular Weight (Mw)

The copolymerized polyester resin was dissolved in tetrahydrofuran so as to have a concentration of 0.2 wt %, measured by gel permeation chromatography (GPC), and weighed using standard polystyrene. GPC was measured using a TSKgel SuperHM-M column available from Tosoh Corporation at a column temperature of 40° C. The eluent was run with tetrahydrofuran at a flow rate of 0.6 ml/min and measured with an RI detector.

(3) Glass Transition Temperature (Tg)

The glass transition temperature of the copolymerized polyester resin was measured as follows. A differential scanning calorimeter (available from Shimadzu Corporation, product name: DSC/TA-60WS) was used, and a measurement sample was prepared by placing about 10 mg of the copolymerized polyester resin in an unsealed aluminum vessel, melting the polyester resin by heating to 280° C. at a temperature rise rate of 20° C./min under a stream of nitrogen gas (30 mL/min), and rapidly cooling the molten resin. This sample was subjected to measurement under the same conditions, and the glass transition temperature was determined as a temperature at which, in the DSC curve, the change reached ½ of the difference in the baseline before and after transition.

(4) Total Light Transmittance

Using an injection-molding machine SE130DU-HP available from Sumitomo Heavy Industries, Ltd., an injection-molded piece having a thickness of 3 mm was prepared from the copolymerized polyester resin at a cylinder temperature of 240° C. to 290° C. and a mold temperature of 60° C., and the total light transmittance thereof was measured. For the measurement, a haze meter (model: NDH-4000) available from Nippon Denshoku Industries Co., Ltd. was used.

(5) Weather Resistance (ΔYI)

Using a super UV tester (model: SUV-W11, metal halide lamp light source) available from Iwasaki Electric Co., Ltd., under the conditions of 55° C. and 50% RH, the injection-molded piece having a thickness of 3 mm obtained in (4) above was irradiated with UV (68 mW/cm$^2$) for 48 hours to perform the weather resistance test. The yellowness of the injection-molded pieces before and after UV irradiation was measured using a haze meter (model: NDH-4000) available from Nippon Denshoku Industries Co., Ltd. in accordance with JIS K7136 to evaluate the rate of increase in yellowness (ΔYI).

O: ΔYI is smaller than 10, X: ΔYI is 10 or greater (6) Pencil Hardness

An injection-molded piece having a thickness of 3 mm was prepared in the same manner as in (4) above, and while gradually increasing the hardness, pencils were sequentially pressed against a surface of the injection-molded piece at an angle of 45 degrees and a load of 750 g in accordance with JIS K5600-5-4, and the hardness of the hardest pencil that did not give a scratch was recorded as the pencil hardness.

(7) Flexural Strength and Flexural Modulus

Using an injection-molding machine SE130DU-HP available from Sumitomo Heavy Industries, Ltd., an injection-molded piece having a thickness of 4 mm, a length of 80 mm, and a width of 10 mm was prepared at a cylinder temperature of 240° C. to 290° C. and a mold temperature of 60° C., and using a strograph available from Toyo Seiki Co. Ltd., the flexural strength (MPa) and flexural modulus (GPa) were measured in accordance with JIS K7171 at a measurement temperature of 23° C. and a measurement humidity of 50% RH.

<Monomer Synthesis Example>

A 500 mL stainless steel reaction vessel was charged with 173 g (2.01 mol) of methyl acrylate and 167 g (1.26 mol) of dicyclopentadiene, which were reacted at 195° C. for 2 hours. The reaction gave a reaction liquid containing 96 g of the monoolefin represented by the following formula (4a). This liquid was subjected to purification by distillation, and a portion of the purified product was used for the subsequent reaction.

A 300 mL stainless steel reaction vessel was used to allow the distillation-purified monoolefin represented by the formula (4a) to undergo hydroformylation reaction using a $CO/H_2$ mixed gas ($CO/H_2$ molar ratio=1). Specifically, the reaction vessel was charged with 70 g of the monoolefin represented by the formula (4a), 140 g of toluene, 0.50 g of triphenyl phosphite, and 550 µL of a separately prepared toluene solution of $Rh(acac)(CO)_2$ (concentration: 0.003 mol/L). After three cycles of purging with nitrogen and three cycles of purging with the $CO/H_2$ mixed gas, the inside of the system was pressurized with the $CO/H_2$ mixed gas, and the reaction was allowed to proceed at 100° C. and 2 MPa for 5 hours. After completion of the reaction, the reaction liquid was analyzed by gas chromatography to confirm that this reaction liquid contained 76 g of the compound represented by the formula (3a) and 1.4 g of the monoolefin represented by the formula (4a) (conversion: 98%, selectivity: 97%). The reaction liquid was subjected to purification by distillation, and a portion of the purified product was used for the subsequent reaction.

A 300 mL stainless steel reaction vessel was charged with 54 g of the distillation-purified compound represented by the formula (3a), 7 mL of a sponge cobalt catalyst (R-400, available from Nikko Rica Corporation), and 109 g of toluene, then the inside of the system was pressurized with hydrogen gas, and the reaction was allowed to proceed at 3 MPa and 100° C. for 9 hours. After the reaction, the resulting slurry was filtered through a membrane filter having a pore size of 0.2 µm to remove the catalyst. After that, the solvent was distilled off using an evaporator, and the resulting product was analyzed by gas chromatography and GC-MS to confirm that the product contained 51 g of the main reaction product of the formula (2a) which has a molecular weight of 250 (main reaction product yield: 93%). Purification by distillation was further conducted to obtain the main reaction product.

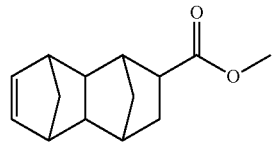

(4a)

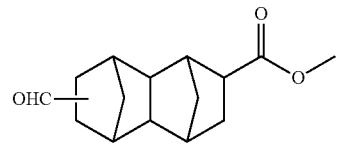

(3a)

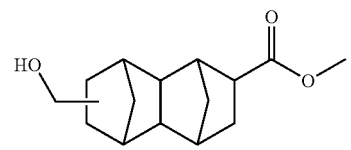

(2a)

<Identification of Reaction Product>

Figure 2:
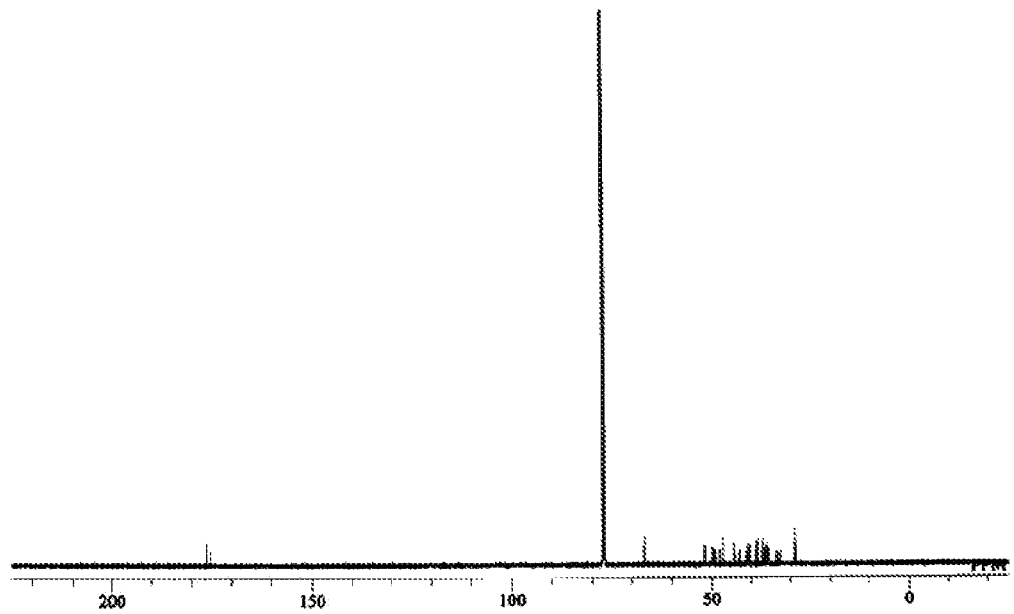
FIG. 2 shows a result of 13C-NMR measurement of the main reaction product obtained in the monomer synthesis example.
Figure 3:
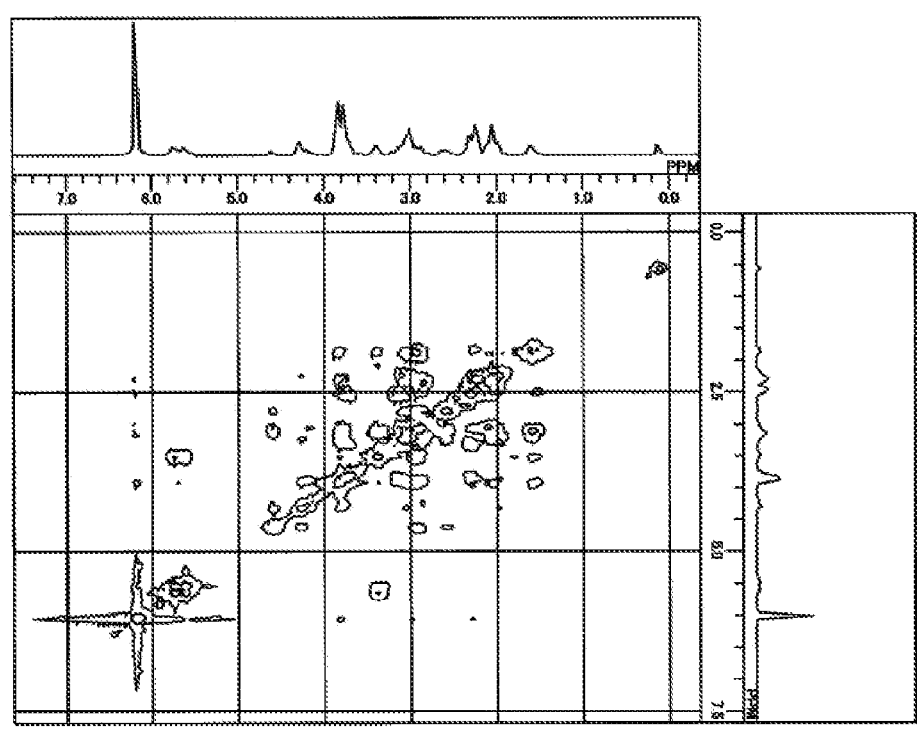
FIG. 3 shows a result of COSY-NMR measurement of the main reaction product obtained in the monomer synthesis example.

The components obtained in the monomer synthesis example were analyzed by NMR. The NMR spectra are shown in FIGS. 1 to 3. The result of GC-MS analysis specified below and the NMR analysis results shown in FIGS. 1 to 3 confirmed that the main reaction product obtained in the monomer synthesis example was the compound represented by the formula (2a).

<Analysis Method>

1) Conditions of Gas Chromatography Measurement

Analyzer: Capillary gas chromatograph GC-2010 Plus, available from Shimadzu Corporation Analysis column: InertCapl (30 m, 0.32 mm I.D., thickness: 0.25 µm), available from GL Sciences Inc.

Oven temperature: 60° C. (0.5 minutes)–15° C./min–280° C. (4 minutes)

Detector: FID, temperature: 280° C.

2) Conditions of GC-MS Measurement

Analyzer: GCMS-QP2010 Plus, available from Shimadzu Corporation

Ionization voltage: 70 eV

Analysis column: DB-1 (30 m, 0.32 mm I.D., thickness: 1.00 µm), available from Agilent Technologies Oven temperature: 60° C. (0.5 minutes)–15° C./min–280° C. (4 minutes)

3) Conditions of NMR Measurement

Apparatus: JNM-ECA500 (500 MHz), available from JEOL Ltd.

Measurement mode: 1H-NMR, 13C-NMR, and COSY-NMR

Solvent: $CDCl_3$ (deuterated chloroform)

Internal standard: Tetramethylsilane

Hereinafter, various compounds are abbreviated as follows.

D-NHEs: Decahydro-1,4:5,8-dimethanonaphthalene-2-methoxycarbonyl-6 (7)-methanol

DMCD: Dimethyl 1,4-cyclohexanedicarboxylate (cis/trans=7/3)

CHDM: 1,4-cyclohexanedimethanol (cis/trans=3/7)

EG: Ethylene glycol

TBT: Tetrabutyl titanate

Example 1

A polyester production apparatus equipped with a partial condenser, a total condenser, a cold trap, a stirrer, a heater, and a nitrogen inlet tube was charged with 85.6 parts by weight of the compound represented by the formula (2a) obtained in the monomer synthesis example, 3.8 parts by weight of DMCD, 2.9 parts by weight of CHDM, and 0.04 parts by weight of TBT (the amount of titanium atom being 70 ppm based on the theoretical resin amount). The temperature was raised to 230° C. under a nitrogen atmosphere and maintained at 230° C. for 1 hour to distil off a certain amount of methanol. After that, 0.003 parts by weight of phosphoric acid (the amount of phosphorus atom being ⅓ of the amount of titanium atom) was added, the temperature was gradually raised in conjunction with gradual pressure reduction, and finally polycondensation was allowed to proceed at 270° C. and at 0.1 kPa or a lower pressure. When the torque reached a predetermined value, the reaction was terminated, and the produced reaction product was extruded into water to obtain pellets of copolymerized polyester resin. The resin composition and glass transition temperature of the resulting copolymerized polyester resin were evaluated, and further, the resulting molded article was evaluated for its total light transmittance, pencil hardness, weather resistance, flexural strength, and flexural modulus. The results of the various evaluations are shown in Table 1.

Examples 2 to 6 and Comparative Example 1

Evaluations were conducted in the same manner as in Example 1, except that starting material proportions were changed as indicated in Table 1.

Comparative Example 2

Evaluations were conducted in the same manner as in Example 1, using a bisphenol A-based polycarbonate resin (available from Mitsubishi Engineering-Plastics Corporation; Iupilon S2000).

The present application claims the priority based on Japanese Patent Application No. 2018-008902 filed in the Japan Patent Office on Jan. 23, 2018, the contents of which are incorporated herein by reference.

The invention claimed is:
1. An automobile component, comprising:
   a molded article comprising a copolymerized polyester resin comprising a unit (A) of formula (1),

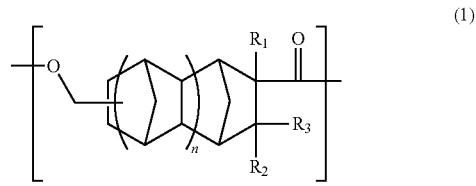

where $R_1$ is a hydrogen atom, $CH_3$, or $C_2H_5$, $R_2$ and $R_3$ are each independently a hydrogen atom or $CH_3$, and n is 1, a diol unit (B), and a unit (C) derived from a dicarboxylic acid or an ester-forming derivative of the dicarboxylic acid, wherein a content of the unit (A) based on total units of the copolymerized polyester resin is from 60 to 90 mol %.

2. The automobile component according to claim 1, wherein $R_1$, $R_2$, and $R_3$ are hydrogen atoms.

3. The automobile component according to claim 1, wherein the diol unit (B) is a unit derived from an aliphatic diol or a diol having a cardo structure.

4. The automobile component according to claim 1, wherein the unit (C) is a unit derived from an aliphatic dicarboxylic acid or an ester-forming derivative of the aliphatic dicarboxylic acid or a unit derived from a dicarboxylic acid having a cardo structure or an ester-forming derivative of the dicarboxylic acid having the cardo structure.

5. The automobile component according to claim 1, wherein the copolymerized polyester resin satisfies a glass transition temperature of 120° C. or higher, and the molded article satisfies a pencil hardness of F or higher.

TABLE 1

| | | | Example 1 | Example 2 | Example 3 | Example 4 | Example 5 | Example 6 | Comparative Example 1 | Comparative Example 2 |
|---|---|---|---|---|---|---|---|---|---|---|
| | | | Synthesis of Polyester resin | | | | | | | |
| Monomer charge (parts by mass) | Hydroxycarboxylic acid | D-NHEs | 85.6 | 76.3 | 64.2 | 70.4 | 55.9 | 46.7 | 21 | — |
| | Dicarboxylic acid/ester | DMCD | 3.8 | 9.6 | 17.1 | 18.8 | 22.3 | 28 | 44.1 | |
| | Diol | CHDM | 2.9 | 7.1 | 12.5 | 0 | 16.3 | 20.4 | 31.9 | |
| | | EG | 0 | 0 | 0 | 9.5 | 0 | 0 | 0 | |
| Catalyst and additive charge (parts by mass) | | TBT | 0.04 | 0.04 | 0.04 | 0.04 | 0.04 | 0.04 | 0.013 | |
| | | Phosphoric acid | 0.003 | 0.003 | 0.003 | 0.003 | 0.003 | 0.003 | 0.001 | |
| | | | Polyester resin evaluation result | | | | | | | |
| Copolymer composition (mol %) | Hydroxycarboxylic acid unit | D-NHEs | 84 | 76 | 60 | 60 | 50 | 40 | 16 | |
| | Dicarboxylic acid unit | DMCD | 8 | 12 | 20 | 20 | 25 | 30 | 42 | |
| | Diol unit | CHDM | 8 | 12 | 20 | 0 | 25 | 30 | 42 | |
| | | EG | 0 | 0 | 0 | 20 | 0 | 0 | 0 | |
| Molecular weight (Mw) × $10^3$ | | | 43 | 45 | 46 | 48 | 50 | 51 | 53 | |
| Glass transition temperature (Tg)(° C.) | | | 158 | 150 | 131 | 130 | 117 | 105 | 70 | 145 |
| Total light transmittance (%) | | | 90 | 90 | 90 | 90 | 90 | 90 | 90 | 89 |
| Weather resistance ΔYI | | | ○ | ○ | ○ | ○ | ○ | ○ | ○ | x |
| Pencil hardness | | | F | F | F | F | F | HB | HB | 2B |
| Flexural strength MPa | | | 100 | 100 | 90 | 95 | 85 | 80 | 68 | 90 |
| Flexural modulus GPa | | | 2.4 | 2.2 | 2.1 | 2.2 | 2.0 | 1.9 | 1.6 | 2.3 |

6. The automobile component according to claim 2, wherein the diol unit (B) is a unit derived from an aliphatic diol or a diol having a cardo structure.

7. The automobile component according to claim 2, wherein the unit (C) is a unit derived from an aliphatic dicarboxylic acid or an ester-forming derivative of the aliphatic dicarboxylic acid or a unit derived from a dicarboxylic acid having a cardo structure or an ester-forming derivative of the dicarboxylic acid having the cardo structure.

8. The automobile component according to claim 2, wherein the copolymerized polyester resin satisfies a glass transition temperature of 120° C. or higher, and the molded article satisfies a pencil hardness of F or higher.

9. The automobile component according to claim 3, wherein the unit (C) is a unit derived from an aliphatic dicarboxylic acid or an ester-forming derivative of the aliphatic dicarboxylic acid or a unit derived from a dicarboxylic acid having a cardo structure or an ester-forming derivative of the dicarboxylic acid having the cardo structure.

10. The automobile component according to claim 3, wherein the copolymerized polyester resin satisfies a glass transition temperature of 120° C. or higher, and the molded article satisfies a pencil hardness of F or higher.

11. The automobile component according to claim 4, wherein the copolymerized polyester resin satisfies a glass transition temperature of 120° C. or higher, and the molded article satisfies a pencil hardness of F or higher.

12. The automobile component according to claim 6, wherein the unit (C) is a unit derived from an aliphatic dicarboxylic acid or an ester-forming derivative of the aliphatic dicarboxylic acid or a unit derived from a dicarboxylic acid having a cardo structure or an ester-forming derivative of the dicarboxylic acid having the cardo structure.

13. The automobile component according to claim 1, wherein the copolymerized polyester resin satisfies a glass transition temperature of 130° C. or higher, and the molded article satisfies a pencil hardness of F or higher.

14. The automobile component according to claim 2, wherein the copolymerized polyester resin satisfies a glass transition temperature of 130° C. or higher, and the molded article satisfies a pencil hardness of F or higher.

15. The automobile component according to claim 3, wherein the copolymerized polyester resin satisfies a glass transition temperature of 130° C. or higher, and the molded article satisfies a pencil hardness of F or higher.

16. The automobile component according to claim 1, wherein the content of the unit (A) based on total units of the copolymerized polyester resin is from 60 to 85 mol %.

17. The automobile component according to claim 2, wherein the content of the unit (A) based on total units of the copolymerized polyester resin is from 60 to 85 mol %.

18. The automobile component according to claim 3, wherein the content of the unit (A) based on total units of the copolymerized polyester resin is from 60 to 85 mol %.

19. The automobile component according to claim 18, wherein the content of the diol unit (B) based on total units of the copolymerized polyester resin is from 6 to 30 mol %, and the content of the unit (C) based on total units of the copolymerized polyester resin is from 6 to 30 mol %.

* * * * *